United States Patent [19]

Karnofsky

[11] 3,993,535
[45] Nov. 23, 1976

[54] MULTIPLE EFFECT EVAPORATION PROCESS

[75] Inventor: George B. Karnofsky, Pittsburgh, Pa.

[73] Assignee: Dravo Corporation, Pittsburgh, Pa.

[22] Filed: Oct. 30, 1974

[21] Appl. No.: 519,228

[52] U.S. Cl. .................. 159/47 R; 159/17 VS; 159/46; 159/17 P; 426/430; 260/412.4
[51] Int. Cl.² .................. B01D 1/26; B01D 1/00; A23L 1/10
[58] Field of Search .................... 203/14–19, 203/40; 159/17 R, 17 VS, 20 R, DIG. 11, 47 R, 46; 260/412.1, 412.2, 412.3, 412.4; 426/430; 202/174

[56] References Cited

UNITED STATES PATENTS

| 1,715,313 | 5/1929 | Suida ........................ 159/17 VS |
| 1,934,677 | 11/1933 | Ash ........................... 159/DIG. 11 |
| 2,010,929 | 8/1935 | Reich ........................ 159/17 VS |
| 2,510,548 | 6/1950 | Brunjes ..................... 159/17 R |
| 2,567,179 | 9/1951 | Bonotto ..................... 260/412.8 |
| 2,790,708 | 4/1957 | Karnofsky .................. 260/412.4 |
| 3,118,775 | 12/1959 | Byer et al ................... 159/20 R |
| 3,271,160 | 9/1966 | Kopas et al ................. 426/430 |
| 3,468,674 | 9/1969 | Levin ......................... 159/DIG. 11 |
| 3,520,868 | 7/1970 | Henderson et al .......... 426/430 |
| 3,630,754 | 12/1971 | Wayne ........................ 426/430 |
| 3,867,416 | 2/1975 | Barns ......................... 260/412.8 |

FOREIGN PATENTS OR APPLICATIONS

| 209,838 | 6/1960 | Austria ....................... 159/27 A |
| 709,044 | 8/1931 | France ........................ 159/17 VS |

Primary Examiner—Jack Sofer
Attorney, Agent, or Firm—Marn & Jangarathis

[57] ABSTRACT

There is disclosed a multiple-effect evaporation system wherein the last effect of the system in the direction of miscella flow is provided with a stripping tower in which vapor effluent from that effect countercurrently contacts feed to that effect. In application to the recovery of solvent from miscella obtained by the extraction of defatted seed material with an aqueous organic carbohydrate-selective solvent, pressure in the evaporation zone of one of the effects is maintained at atmospheric. Additionally, at least one of the effects other than said last effect may be provided with a rectification column.

17 Claims, 2 Drawing Figures

MULTIPLE EFFECT EVAPORATION PROCESS

BACKGROUND OF THE INVENTION

This invention relates to a process and apparatus applicable where an aqueous solvent is to be recovered by multiple effect evaporation with the simultaneous recovery of solute, and more particularly, where a miscella obtained by the extraction of defatted seed material with organic carbohydrate-selective extraction solvent is to be separated by multiple effect evaporation and stripping into recovered solvent and solute dissolved in water free of said organic constituent.

Oleaginous seed materials, such as soybeans, cottonseeds, peanuts, sesame seeds, and sunflower seeds contain high concentrations of nutritious proteins. Other constituents are fiber, oil and carbohydrates. Since the carbohydrates are often associated with characteristic undesirable flavors and since they are also the cause of flatulence when the untreated seeds are used in a human diet, it is known to extract flaked seeds first with a solvent, such as hexane, to remove the oil content and then to extract the defatted flakes with a carbohydrate-selective solvent, to leave as the residue a protein concentrate. One class of carbohydrate-selective solvents known to the art is aqueous solutions of low boiling alcohols, such as methanol, ethanol, and isopropanol.

A complete carbohydrate extraction process necessarily includes an extraction step, a spent flakes desolventizing step, and a miscella evaporation step. Such a process employing aqueous alcohol for the extraction of defatted seed material, such as soybean flakes, is exemplified by the disclosure of co-pending application Ser. No. 371,148 filed June 18, 1973, assigned to the same assignee as the present invention. Extraction is carried out in a series of stages, each stage comprising in sequence contacting solvent and solids, separating the phases, and expressing the wet solid to further reduce the solvent retained therein. Flow of solvents and solids in each stage is concurrent; but flow of solids and solvent between stages is countercurrent. Expressed solids from the extractor are desolventized by heating and are then stripped of residual alcohol by contacting with steam or other inert gas. Miscella is evaporated to recover solvent while simultaneously recovering the extracted carbohydrates as a syrup in aqueous solution which has been stripped free of alcohol. It is the evaporation and stripping step that is the subject of this invention.

OBJECTS OF THE INVENTION

Objects of the present invention are to provide a novel multiple effect evaporating and stripping process and apparatus:

for treating a carbohydrate-enriched solvent for the separation of components of a feed stream with minimum consumption of steam;

for treating a carbohydrate-enriched solvent obtained in a process for treating seed material to recover a protein concentrate product;

for treating an aqueous alcohol solution with minimum consumption of steam to recover an aqueous alcohol solvent stream while removing water from the system;

for treating an aqueous alcohol solution with minimum consumption of steam to recover aqueous alcohol solvent streams of at least two different concentrations while simultaneously removing water from the system;

for simultaneously recovering carbohydrates and solvent from carbohydrate-enriched solvent resulting from extraction of seed material in a process for making a protein concentrate; and for simultaneously recovering carbohydrates and aqueous alcohol solvent streams having at least two different alcohol concentrations from carbohydrate-enriched aqueous alcohol solution resulting from the extraction of seed material in a process for making protein concentrate.

SUMMARY OF THE INVENTION

These and other objects of the invention are achieved in a multiple-effect evaporation system wherein the last effect of the system in the direction of miscella flow is provided with a stripping tower in which vapor effluent from such last effect countercurrently contacts the feed to that effect.

In a preferred embodiment of the invention, miscella obtained by the extraction of defatted soybeans with a carbohydrate-selective extraction solvent is introduced into a multiple-effect evaporative process and apparatus provided with two or more effects wherein the vapor effluent from the last effect in the direction of liquid flow counter currently contacts concentrated miscella fed to such last effect.

BRIEF DESCRIPTION OF THE DRAWINGS

A better understanding of the present invention as well as additional objects and advantages thereof will become apparent upon consideration of the detailed disclosure thereof, especially when taken with the accompanying drawings, wherein like numerals designate like parts throughout, and wherein.

DETAILED DESCRIPTION OF THE INVENTION

Figure 1:
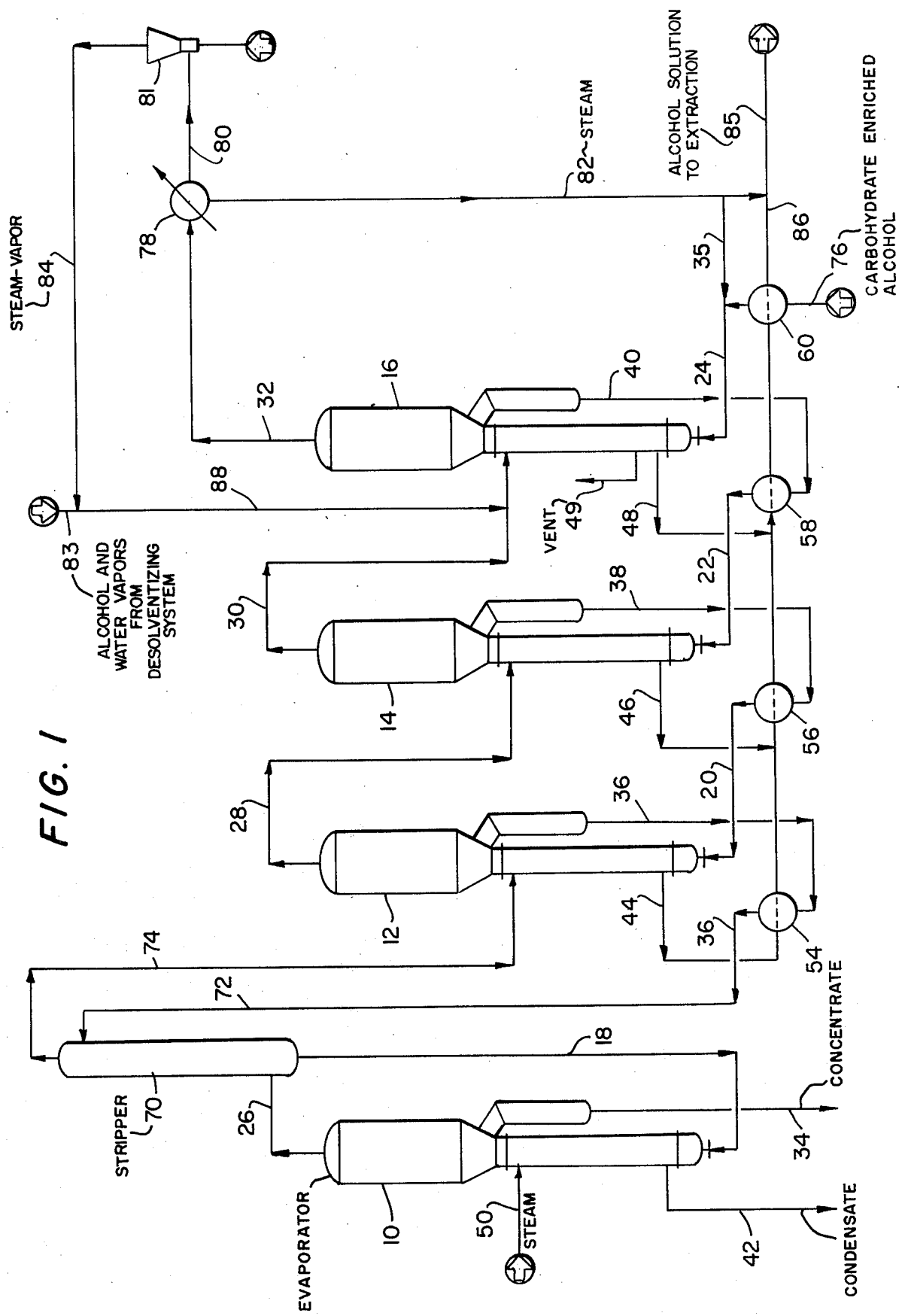
FIG. 1 is a schematic flow diagram of one embodiment of a process and apparatus of the present invention illustrating the recovery of a carbohydrate-selective extraction solvent.

Aqueous alcohols are preferred solvents for carbohydrates in processes for preparing protein concentrates because they selectively extract carbohydrates with minimum simultaneous extraction of proteins. Alcohol concentration of the solution used as solvent may range from 40% to 80%. Concentrations at the low end of the range have the advantage that carbohydrates inherent in the seed material are relatively soluble, so that extraction of the desired amount of carbohydrates is accomplished with minimum solvent, with consequent minimum heat and equipment cost for solvent recovery by evaporation. The disadvantages of using aqueous alcohols at the low end of the concentration range are that: the aqueous alcohols are less selective in extracting carbohydrates without simultaneous extraction of protein; the flakes wetted by the solvent become mushy and difficult to handle; and considerable solvent is retained even after expression of the extracted flakes to be desolventized. Additionally, it is known that proteins are more rapidly denatured by contact with aqueous alcohols at alcohol concentration within the low end of the range, so that they cannot be used if the extraction process is required to produce a protein concentrate having high protein dispersibility. Conversely, when aqueous alcohols at the high end of the concentration range are used as selective carbohydrate solvents, they have the disadvantage of being relatively poor solvents for carbohydrates, and the advantages are not softening the flakes, of being more completely expressible from extracted flakes prior to desolventizing, and of not denaturing the proteins.

It was such consideration that led to the disclosure by O'Hara et al (U.S. Pat. No. 3,207,744), of a process in which the flakes are first treated with aqueous alcohol of low alcohol concentration to extract carbohydrates with a minimum of solvent, and then treated with aqueous alcohol of high concentration to reduce the amount of solvent in the flakes sent to the desolventizer. In this system, solvent is necessarily recovered from the miscella in two fractions, one of high alcohol concentration and the other of low alcohol concentration.

Whether the solvent is strong or weak alcohol, the ratios of solvent to flakes required for extraction are high compared with those customarily used in oil seed extraction. It is the commercial practice to remove oil from soybeans by countercurrent extraction using less than one pound of hexane solvent per pound of flakes. Extraction with aqueous alcohol requires ratios of solvent to flakes ranging from 4:1 to 20:1, increasing with increasing alcohol concentration. Since aqueous alcohols have considerably higher latent heats of vaporization than does hexane, it is apparent that recovery of solvent from a carbohydrate extraction requires much more expensive steam than does oil extraction. It is understood by all those skilled in the art that steam required for evaporation recovery of solvent from the miscella can be minimized by employing multiple effect evaporation.

As compared with evaporation of hexane from miscella of oil in hexane resulting from conventional processes for extracting oil from oleaginous seed materials, evaporation of aqueous alcohol from carbohydrate-enriched miscella is much more complex. Carbohydrate residue from the evaporation, which in the absence of water is solid, is most desirably recovered as an aqueous syrup which can be disposed of by adding it to oil-free seed materials as animal feed. To accomplish this, water is introduced into the evaporation system, over and beyond that evaporated to recover recycle evaporation solvent of the required water content, sufficient to make the syrup. It may not be necessary to add water deliberately for this purpose, since any direct steam used in the process or water transferred from the flakes into the miscella is withdrawn from the process as bottoms from the evaporator. The aqueous carbohydrate solution exiting the evaporation process must be freed of alcohol.

These objects are achieved with minimum steam consumption by the process and apparatus of the present invention. The equipment comprises a multiple effect evaporation system (four effects are portrayed in the drawings, but the invention can be practiced with less effects). Vapor from the effect from which the stripped aqueous alcohol leaves is passed through a stripping column countercurrent to the feed to that effect. Since the amount of steam that is required to provide heat for an unmodified multiple effect evaporator determined by the total vaporization to be accomplished and by the number of effects, controls the amount of vapor that rises into the stripping column, and since this may not be sufficient to strip alcohol from the aqueous bottoms, provision is made to increase that vapor by refluxing to the effect at lowest pressure condensed vapor from that effect.

Figure 2:
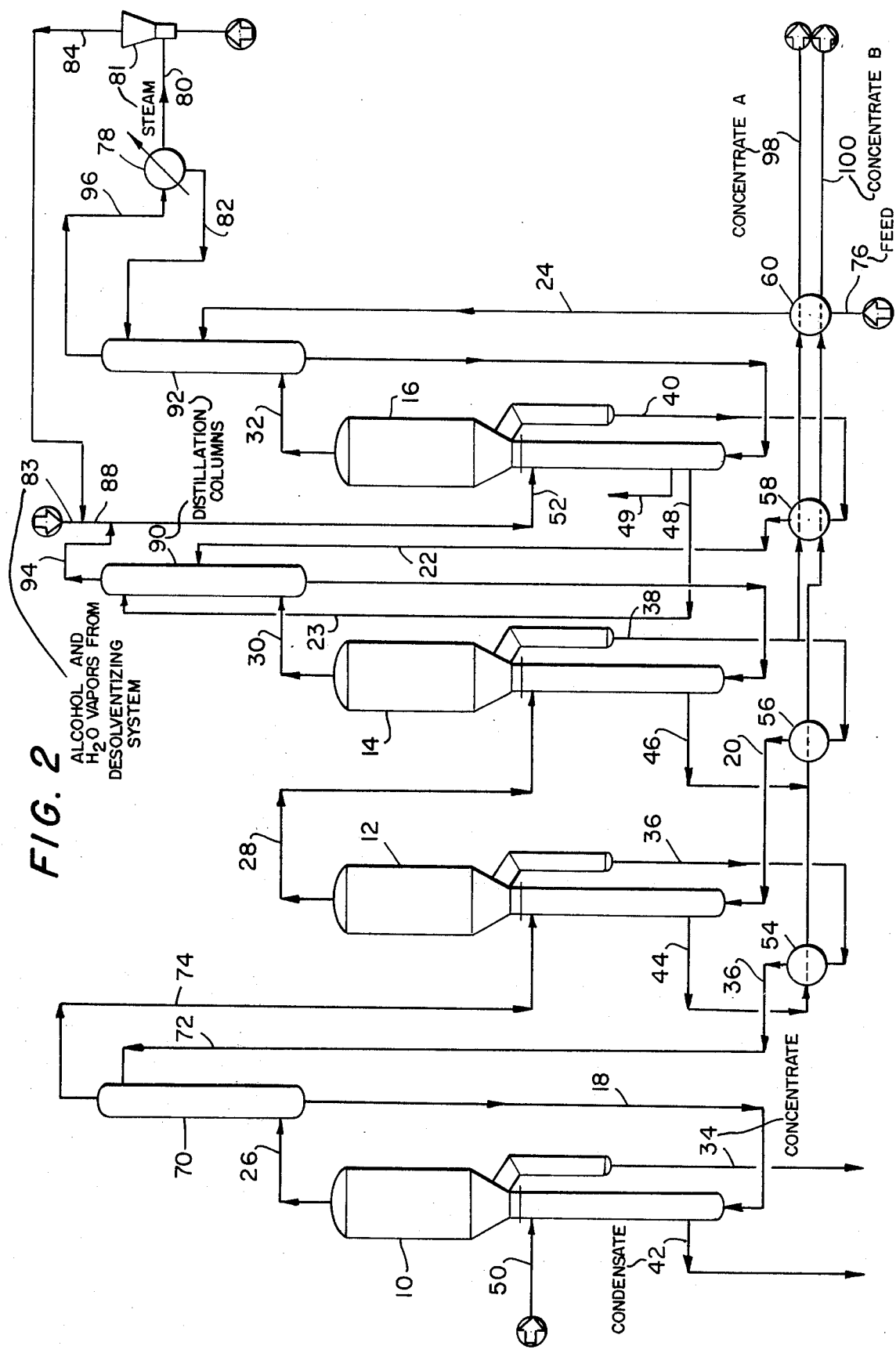
FIG. 2 is a schematic flow diagram of another embodiment of the present invention wherein carbohydrate-selective extraction solvents of different concentrations are recovered.

FIG. 1 exemplifies the system used when only a single solvent stream is to be recovered whereas FIG. 2 exemplifies the system when it is desired to recover two solvent streams with differing alcohol concentrations. It is to be understood that equipment, such as certain valves, indicators and the like have been omitted from the drawing to facilitate the disclosure thereof and that the placing of such equipment at appropriate places is deemed to be within the scope of those skilled in the art. Additionally, it is assumed that operation of a multiple effect evaporation system is known to the art and does not have to be explained in detail.

To facilitate understanding of the present invention, the process and apparatus therefor will be described with reference to the treatment of miscella obtained by the further extraction of defatted oleaginous feed material with a carbohydrate selective solvent. It will be understood by those skilled in the art that the same process and apparatus apply equally well to any situation where an aqueous volatile solvent is to be recovered by multiple-effect evaporation with simultaneous recovery of solvent-free water or aqueous solution as stripped bottoms.

Referring now to FIG. 1, illustrating one embodiment of the evaporative system of the present invention, there is provided a plurality of evaporators 10, 12, 14 and 16. Such evaporators are illustrated as being of the once-through rising film type, but may be modified for natural circulation by appropriate piping and valving connections. Such vertical rising film evaporators are particularly desirable for foamy solutions containing carbohydrates which result from the extraction of defatted soy flakes with aqueous alcohol solutions. As hereinabove mentioned, the evaporative system is arranged for multiple-effect operation with countercurrent flow of the vapor and liquid streams. The evaporators 10, 12, 14 and 16 are provided with liquid inlet feed lines 18, 20, 22 and 24, respectively. Vapors from the evaporators 10, 12, 14 and 16 are withdrawn through lines 26, 28, 30 and 32, respectively; and liquid streams therefrom are withdrawn through lines 34, 36, 38 and 40, respectively. Condensates from the evaporators 10, 12, 14 and 16 are withdrawn from the shell sides through lines 42, 44, 46 and 48 respectively. A heat transfer medium such as steam is introduced by line 50 into the shell side of the first effect evaporator 10, with the heat transfer media for evaporators 12, 14 and 16 being provided as more fully hereinafter discussed. The evaporative system of the present invention is provided for heat economy with intermediate indirect heat exchangers 54, 56, 58 and 60, as is common in the art.

A stripping tower 70 is provided auxiliary to the evaporator 10. A vapor stream from the evaporator 10 in line 26 is introduced into the lower portion of the stripping tower 70 and is passed in countercurrent contact with the liquid stream in line 72 to cause the more volatile component in such liquid stream 72 to be stripped therefrom. Overhead vapors are withdrawn from stripping tower 70 in line 74 and are passed to the shell side of evaporator 12 as the heat transfer medium therefor.

In operation, feed, e.g. a carbohydrate-enriched alcohol solution is introduced into the evaporation system through line 76, is passed through indirect heat interchanger 60 and is introduced into the tube side of evaporator 16 (the 4th effect). This effect is heated by a vapor stream in line 30 from evaporator 14 (the 3rd effect), which in specific application to protein concentrate processing contemplated by FIG. 1, is mixed with a vapor stream in line 88. The vapor stream in line 88 is a mixture of alcohol and water vapors from the desolventizing system entering in line 83, and a vapor stream in line 84, mostly steam, from a steam-jet ejector 81. A condenstate in line 82 is withdrawn from the condenser 78 and is combined in line 85 with condensate in line 86 to constitute the recovered aqueous alcohol solution to be recycled to the extraction process (not shown). The pressure in the shell side of the heating bundle of the evaporator 16 (4th effect) is atmospheric or slightly below atmospheric, since the shell side is vented to atmosphere or to a vent system held at slightly below atmospheric pressure through line 49. The evaporator 16 (4th effect) is operated under vacuum maintained by the ejector 81 which follows the condenser 78. In this manner, latent heat inherent in the vapor stream from the desolventizer, (which most advantageously operates at atmospheric pressure) and from the ejector 81, is recovered by contributing part of the heat load of the 4th effect.

The evaporator 12 (2nd effect) and evaporator 14 (3rd effect) are operated in a normal manner, vapor from the 1st effect in line 74 condensing in the shell side of the heating bundle of the 2nd effect, and vapor from the 2nd effect in line 28 condensing in the shell side of the heating bundle of the 3rd effect. Pressure in line 30 is essentially atmospheric, in line 28 higher, and in line 74 higher still.

The 1st effect 10 is heated by condensing steam in line 50. Condensate exits the shell side of the heating bundle of evaporator 10 through line 42. Vapor flows from the 1st effect through line 26 into the stripping tower 70, wherein the vapor is contacted countercurrently with liquid from line 72. Stripped liquid from the tower flows through line 18 to the bottom of the heating bundle of the 1st effect 10, which functions as the reboiler for the stripping tower.

A controlled portion of the condensate flowing in line 82 may be recycled to evaporator 16 through line 35. The purpose of the stripping tower 70 is to strip overhead the alcohol that is in the liquid in line 72, so that the liquid that leaves the 1st effect through line 34 is essentially free of alcohol. It will be understood by those skilled in the arts of stripping and multiple-effect evaporation that the amount of vapor required to flow through line 26 to accomplish this stripping may well be more than is required for ordinary multiple-effect evaporation without stripping. The effect of reflux of part of the condensate of the 4th effect through line 35 is to increase the amount of steam in line 50 beyond what it would be for ordinary multiple-effect evaporation, but the increase is minimal since the latent heat of this additional steam is reused in each effect downstream.

It will also be understood that in the multiple-effect evaporation of aqueous alcohol solutions there occurs in each effect the fractionation characteristic of simple distillation, so that the vapors leaving the effects, measuring from 1st to 4th, are increasingly strong in alcohol. If it serves a useful purpose, the condensates from the effects need not be mixed, as is shown on FIG. 1, but may be collected separately.

Referring now to FIG. 2, where the numerals represent like parts as in FIG. 1, there is illustrated another embodiment of the present invention wherein alcohol solutions of two or more concentrations are to be recovered, their concentrations differing more than can be accomplished by the apparatus of FIG. 1. As compared with FIG. 1, distillation columns 90 and 92 are added, associated with evaporators 14 and 16, respectively, which function as reboilers.

Feed to the system in line 24 enters the distillation column 92 at a point intermediate the top and bottom, and is rectified. A vapor stream from evaporator 16 enters the distillation column 92 through line 32. Reflux to the column 92 is a controlled portion of the condensate from condenser 78, which enters the column through line 82. Likewise, bottoms from evaporator 16 are passed to column 90 through line 22, a vapor stream from the evaporator 14 enters the column 90 through line 30; and a controlled portion of the condensate in line 48 is refluxed to the column through line 23.

For convenience FIG. 2 illustrates the manner in which alcohol solutions of two different concentrations in approximately equal amounts can be made as products leaving the system in lines 98 and 100. It will be apparent that more than two distilled products can be made, if desired, by segregating condensates.

Example of the Invention

The following example is illustrative of the conditions of the process of the invention.

Miscella from the extraction of defatted flakes entering the evaporation system portrayed in FIG. 1 in line 76 contains 4000 lbs/hr. of extract, 40,500 lbs/hr. of ethanol and 60,000 lbs./hr. of water. Vapor from the desolventizer entering in line 83 contains 4800 lbs/hr of ethanol and 9400 lbs/hr. of water. The alcohol and most of the water are to be recovered as distillates, while the extract is withdrawn from the system in line 34 dissolved in 6500 lbs/hr of water containing a maximum of 10 lbs/hr. of ethanol. Pressure in the 3rd effect 14 is atmospheric, so that vapors from the desolventizer and an additional 200 lbs/hr. of steam in line 84 can be used to heat the 4th effect 16.

In order to strip the exciting extract aqueous solution to the desired degree, the stripping tower 70 was provided with the equivalent of eight theoretical stages, assuming that flow in line 35 was zero. It is most economical of steam to design the system on the basis that reflux in line 35 is zero during normal operation. However, provision was made for reflux through line 35 in case more than 6500 lbs/hr. of water had to be withdrawn through line 34 for a short time. The following table illustrates the processing conditions for the above example.

Table I

| Stream No. | Water | Ethanol | Extract | Temperature F° |
|---|---|---|---|---|
| 24 | 60,000 | 40,500 | 4,000 | 150 |
| 40 | 42,200 | 20,400 | 4,000 | 150 |
| 32 | 17,800 | 20,000 | — | 150 |
| 38 | 31,100 | 11,600 | 4,000 | 200 |
| 30 | 11,100 | 8,400 | — | 196 |
| 38 | 9,600 | 4,800 | — | 200 |
| 36 | 19,100 | 5,100 | 4,000 | 255 |
| 28 | 12,000 | 6,500 | — | 250 |
| 34 | 6,500 | 10 | 4,000 | 327 |

Table I-continued

| Stream No. | Water | Ethanol | Extract | Temperature F° |
|---|---|---|---|---|
| 74 | 12,600 | 5,100 | — | 321 |

While the invention has been described with reference to countercurrent flow of liquid and vapors in the multiple effect evaporation system, it will be understood that cocurret flow may be utilized. In that case, the stripping column would be associated with the last effect, operating under vacuum. The advantages would be that inter-effect pumps would be eliminated and the temperature of the concentrated extract solution minimized. Offsetting these advantages are: that the lowest boiling solution would be at the high pressure end of the system, thereby increasing the pressure in those effects operating above atmospheric pressure, and that the vapor condensing in each effect except the 1st has a higher alcohol content than does the liquid boiling in that effect, thereby decreasing the effective utilization of the temperature difference between heating steam at the 1st effect and cooling medium at the condenser.

It will be understood that although the invention has been described with reference to a quadruple effect evaporator, any number of effects greater than one may be utilized. Also, although the invention has been described with reference to a natural circulation evaporator, any suitable evaporator — for example a forced circulation evaporator — may be used. Also, although the invention has been described with reference to oil seeds, it is equally applicable to any process where aqueous organic solvents are to be recovered from miscellas.

Specifically, it is also applicable to the solutions resulting from the extraction of fish residues with aqueous alcohols to make fish protein concentrate (FPC). If the fish residue is dried prior to extraction with an aqueous alcohol, then the process of FIG. 1 applies, since the solvent can be recovered without rectification. If the fish residue is not dried, the solvent is considerably diluted, and must be rectified by the process of FIG. 2.

What is claimed is:

1. In a process for treating by multiple-effect evaporation system an aqueous organic solution including organic solutes obtained from a process for extracting a solids material with an aqueous solution of a volatile organic solvent wherein said aqueous solution of a volatile organic solvent is recovered by multiple-effect evaporation while simultaneous removing the organic solutes with the undistilled bottoms, including water substantially free of said organic solvent, the improvement comprising countercurrently contacting vapor withdrawn from the last effect of said multiple effect evaporation system counting in the direction of liquid flow with a liquid stream to be introduced into said last effect.

2. The process as defined in claim 1 wherein a portion of the vapor from a first effect is condensed and admixed with a liquid to be treated in said zone.

3. The process as defined in claim 1 wherein the organic aqueous solution to be treated is a miscella obtained from a process in which fish residue are extracted with aqueous alcohol solution to produce fish protein concentrate.

4. The process as defined in claim 1 wherein the pressure in the evaporation zone of the next to last effect counting in the direction of vapor flow is maintained at about atmospheric.

5. The process as defined in claim 4 wherein vapor from a spent solids desolventizer zone is mixed with the vapor originating in the evaporation zone of said next to last effect.

6. The process as defined in claim 1 wherein a carbohydrate-enriched miscella is treated by said process to recover a carbohydrate-selective extraction solvent.

7. The process as defined in claim 6 wherein said carbohydrate-selective extraction solvent is an aqueous solution of low boiling alcohol selected from the group consisting of methanol, ethanol, and isopropanol.

8. The process as defined in claim 6 wherein said carbohydrate-enriched miscella is obtained by contacting a defatted oleaginous seed material with a carbohydrate selective solvent.

9. The process as defined in claim 8 wherein said defatted oleaginous seed material is defatted soybean flakes.

10. The process as defined in claim 8 wherein a carbohydrate enriched solution obtained by contacting a defatted oleaginous seed material with a carbohydrate selective solvent is treated by said process to recover carbohydrate selective extraction solvents of at least two different concentrations.

11. The process as defined in claim 10 wherein such carbohydrate selective extraction solvent is an aqueous alcohol solution selected from the group consisting of methanol, ethanol and isopropanol.

12. The process as defined in claim 1 wherein the vapor from the evaporation zone of at least one effect other than the said last effect is countercurrently contacted with liquid to be introduced into said other effect.

13. The process as defined in claim 12 wherein the organic aqueous solution to be treated is a miscella into said multiple effect evaporation process and where said miscella obtained a process in which fish residue are extracted with aqueous alcohol solution to produce fish protein concentrate.

14. The process as defined in claim 12 wherein said vapor from said last effect is introduced into the bottom of a rectifying column and wherein the solution to be treated is introduced into a zone between the top and bottom of said rectifying column, and condensed vapor from said rectifying column is refluxed to the top of said rectifying column.

15. The process as defined in claim 12 wherein said volatile organic liquid is recovered in at least two aqueous solutions of different concentrations.

16. The process as defined in claim 12 wherein the pressure in the evaporation zone of the next to last effect counting in the direction of vapor flow is maintained at about atmospheric pressure.

17. The process as defined in claim 16 wherein vapor from a spent solids desolventizing zone in a process for extracting solids material is mixed with the vapor originating in the evaporation zone of said next to last effect.

* * * * *